Patented Aug. 3, 1943

2,325,979

UNITED STATES PATENT OFFICE 2,325,979

SOFTENING SYNTHETIC RUBBER

Donald V. Sarbach, Cuyahoga Falls, Ohio, assignor to The B. F. Goodrich Company, New York, N. Y., a corporation of New York No Drawing. Application March 25, 1941, Serial No. 385,142

10 Claims. (Cl. 260—36)

This invention relates to the softening of synthetic rubber and to a new class of softeners which produce a great increase in plasticity when incorporated in unvulcanized synthetic rubber.

The softening of synthetic rubber has in general presented problems not encountered in the softening of natural rubber due to different behavior on mill rolls, incompatibility of synthetic rubber with certain softening materials commonly employed in natural rubber and other differences in properties. While the problem of satisfactorily softening synthetic rubber has been particularly difficult in the case of copolymers of butadiene and acrylonitrile, other synthetic rubbers prepared by the polymerization of conjugated dienes have also presented problems. The difficulty has been increased by the fact that softeners for one type of synthetic rubber do not in all cases function similarly in other types of synthetic rubber. Even varying the proportions of the monomers in the mixtures employed to form copolymers has necessitated the search for new softeners for the synthetic rubber product.

I have discovered a new class of softeners which may be employed to soften any of the synthetic rubbers prepared by the polymerization of conjugated butadienes, either alone or in the presence of other polymerizable materials. These new softeners are compounds having the structural formula

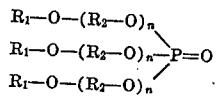

wherein $R_1$ represents a monovalent hydrocarbon group; $R_2$ represents a bivalent hydrocarbon group and $n$ is an integer. Thus, for example, $R_1$ may be methyl, ethyl isopropyl, sec. butyl, allyl, benzyl, cyclohexyl, phenyl, tolyl, xenyl, naphthyl or other monovalent hydrocarbon groups; $R_2$ may be any of the corresponding bivalent hydrocarbon groups and the various $R_1$ and $R_2$ groups may be the same or different at each occurrence in the structural formula. Although the integer, $n$, may be as large as desired, as a practical matter, compounds containing $R_1$—O—$R_2$—O—, $R_1$—O—$R_2$—O—$R_2$—O—, or $R_1$—O—$R_2$—O—$R_2$—O—$R_2$—O— groups (i. e., those in which $n$ is an integer less than four) are ordinarily employed.

The preferred class of softeners is the tri-alkoxyalkyl phosphates such as tri-butoxyethyl phosphate, tri-ethoxyethyl phosphate, tri-methoxyethyl phosphate, tri-ethoxypropyl phosphate, etc., although other classes such as the tri-aryloxyalkyl phosphates such as tri-phenoxyethyl phosphate and the tri-alkoxyalkoxyalkyl phosphates such as tri-butoxyethoxyethyl phosphate may be employed if desired. Compounds such as methoxyethyl ethoxyethyl butoxyethyl phosphate which may be prepared from mixtures of partially substituted glycols may also be employed.

The softeners of this invention may be incorporated into synthetic rubber by any desired method as by adding the softener to synthetic rubber while the rubber is being worked on a roll mill, masticating a mixture of rubber and the softener in an internal mixer, or adding the softener to a solution or dispersion of the synthetic rubber.

As a specific example of this invention, 50 parts of tri-butoxyethyl phosphate were incorporated together with conventional compounding ingredients in 100 parts of a synthetic rubber prepared by the copolymerization in aqueous emulsion of 55 parts of butadiene and 45 parts of acrylonitrile. The resulting stock was softer and more plastic than those containing previously-employed phosphates such as tricresyl phosphate. When the stocks were cured, the vulcanizates had a considerably greater rebound than vulcanizates containing equal amounts of tricresyl phosphate. It was further observed that both the uncured and cured stocks retained their flexibility at temperatures 10–20° C. lower than the stocks containing tricresyl phosphate.

In another experiment, a very soft, plastic stock into which compounding ingredients could readily be incorporated was obtained by incorporating an equal weight of tri-butoxyethyl phosphate with a synthetic rubber prepared by the copolymerization in aqueous emulsion of 55 parts of butadiene and 45 parts of acrylonitrile. Softeners belonging to this same class have also been successfully employed to soften compolymers of butadiene and methyl methacrylate and copolymers of butadiene and styrene.

The softeners herein described may be employed in conjunction with synthetic rubber prepared by the polymerization of a conjugated butadiene such as butadiene-1,3 which is commonly called butadiene, isoprene, chloroprene, piperylene, 2,3-dimethylbutadiene, ec., either alone or in admixture with each other or with olefinic monomers copolymerizable therewith such as styrene, vinyl benzene, isobutylene, acrylonitrile, methyl methacrylate, methyl vinyl ketone, vinylidene chloride, methyl vinyl ether, and other polymerizable olefinic hydrocarbons, nitriles, esters, ketones, halides and ethers. The polymerization to form a synthetic rubber may be effected by any of the well-known methods known to the art such as homogeneous polymerization, polymerization in an aqueous emulsion, etc.

Although I have herein disclosed specific embodiments of my invention, I do not intend to limit the invention solely thereto, for many variations and modifications are within the spirit and scope of the invention as defined in the appended claims.

I claim:

1. A composition of matter comprising a rubbery polymer of a conjugated butadiene and, as a softener therefor, a compound of the formula

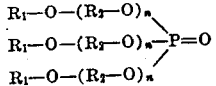

wherein $R_1$ is a monovalent hydrocarbon group, $R_2$ is a bivalent hydrocarbon group and $n$ is an integer.

2. A composition of matter comprising a rubbery polymer of a conjugated butadiene and, as a softener therefor, a tri-alkoxyalkyl phosphate.

3. A composition of matter comprising a rubbery copolymer of a conjugated butadiene and a copolymerizable mono-olefinic compound and, as a softener therefor, a compound of the formula

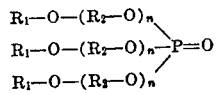

wherein $R_1$ is a monovalent hydrocarbon group, $R_2$ is a bivalent hydrocarbon group and $n$ is an integer less than four.

4. A vulcanized composition comprising a rubbery copolymer of butadiene-1,3 and a copolymerizable mono-olefinic compound and, as a softener therefor, a tri-alkoxyalkyl phosphate.

5. A composition of matter comprising a rubbery copolymer of butadiene-1,3 and acrylonitrile and, as a softener therefor, a tri-alkoxyalkyl phosphate.

6. A composition of matter comprising a rubbery copolymer of butadiene-1,3 and methyl methacrylate and, as a softener therefor, a tri-alkoxyalkyl phosphate.

7. A composition of matter comprising a rubbery copolymer of butadiene-1,3 and styrene and, as a softener therefor, a tri-alkoxyalkyl phosphate.

8. The composition of claim 5 wherein the softener is tri-butoxyethyl phosphate.

9. The composition of claim 6 wherein the softener is tri-butoxyethyl phosphate.

10. The composition of claim 7 wherein the softener is tri-butoxyethyl phosphate.

DONALD V. SARBACH.